United States Patent [19]

Eklund

[11] Patent Number: 6,003,347
[45] Date of Patent: Dec. 21, 1999

[54] LOCKING SYSTEM

[75] Inventor: Anders Eklund, Falun, Sweden

[73] Assignee: Jade Las-Montage AB, Falun, Sweden

[21] Appl. No.: 09/029,488

[22] PCT Filed: Aug. 30, 1996

[86] PCT No.: PCT/SE96/01078

§ 371 Date: Apr. 7, 1998

§ 102(e) Date: Apr. 7, 1998

[87] PCT Pub. No.: WO97/08043

PCT Pub. Date: Mar. 6, 1997

[30] Foreign Application Priority Data

Aug. 30, 1995 [SE] Sweden .................................. 9502997

[51] Int. Cl.⁶ .................................................. E05B 73/00
[52] U.S. Cl. ........................ 70/14; 70/18; 70/58; 70/233
[58] Field of Search .................... 70/14, 18, 30, 70/49, 58, 233, 234, 423–428, 455, DIG. 63

[56] References Cited

U.S. PATENT DOCUMENTS

| | | | |
|---|---|---|---|
| 1,539,301 | 5/1925 | Cooper | 70/49 |
| 3,765,197 | 10/1973 | Foote | 70/58 |
| 3,785,183 | 1/1974 | Sander | 70/58 |
| 3,859,826 | 1/1975 | Singer et al. | 70/58 |
| 3,996,775 | 12/1976 | Waldron | 70/234 |
| 4,051,703 | 10/1977 | Plaiss | 70/183 X |
| 4,055,060 | 10/1977 | Bellino | 70/234 |
| 4,073,165 | 2/1978 | Grundstrom et al. | 70/455 X |
| 4,186,576 | 2/1980 | Means et al. | 70/233 |
| 4,347,720 | 9/1982 | Kenyon | 70/14 |
| 4,480,450 | 11/1984 | Brown | 70/14 |
| 4,570,465 | 2/1986 | Bennett | 70/18 |
| 5,007,260 | 4/1991 | Sharp | 70/233 |

FOREIGN PATENT DOCUMENTS

| | | | |
|---|---|---|---|
| 0034554 | 8/1981 | European Pat. Off. . | |
| 49904 | 4/1982 | European Pat. Off. | 70/233 |
| 476260 | 3/1992 | European Pat. Off. | 70/30 |
| 472922 | 8/1914 | France | 70/DIG. 63 |
| 2529606 | 1/1984 | France . | |
| 2566824 | 1/1986 | France . | |
| 8575 | 4/1898 | United Kingdom | 70/DIG. 63 |
| 279287 | 10/1927 | United Kingdom | 70/234 |
| 1557208 | 12/1979 | United Kingdom | 70/18 |
| WO83/01646 | 5/1983 | WIPO | 70/233 |
| WO88/04628 | 6/1988 | WIPO . | |

*Primary Examiner*—Lloyd A. Gall
*Attorney, Agent, or Firm*—Young & Thompson

[57] ABSTRACT

The invention relates to a lock system for locking theft attractive property to fixed, preferably immovable objects (3), such as buildings, posts, etc., with the aid of an anchoring member (2) and a user-carried separate lock (6). The anchoring member (2) includes a first end (2a) which may be connected fixedly to the fixed object or the property. The anchoring member (2) also includes a second end (2b) which with the aid of the lock (6) may be locked either directly to a part of the property or to the fixed object subsequent to having passed an intermediate part (2c) of the anchoring member around a part of the property.

8 Claims, 2 Drawing Sheets

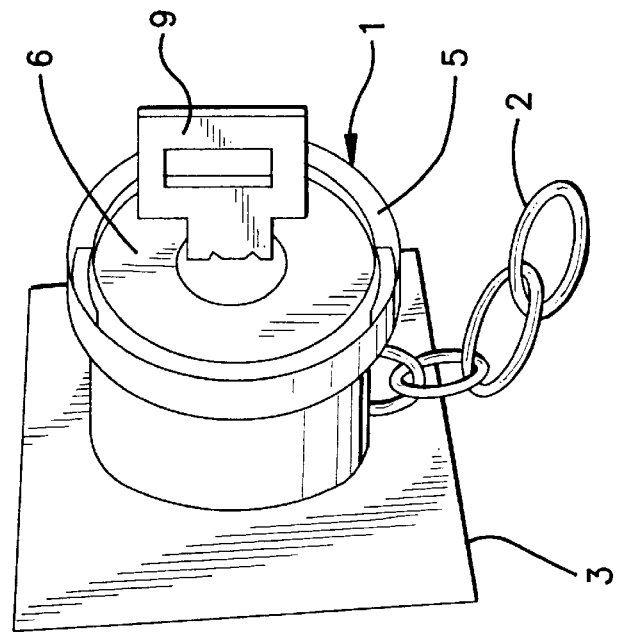
FIG. 2
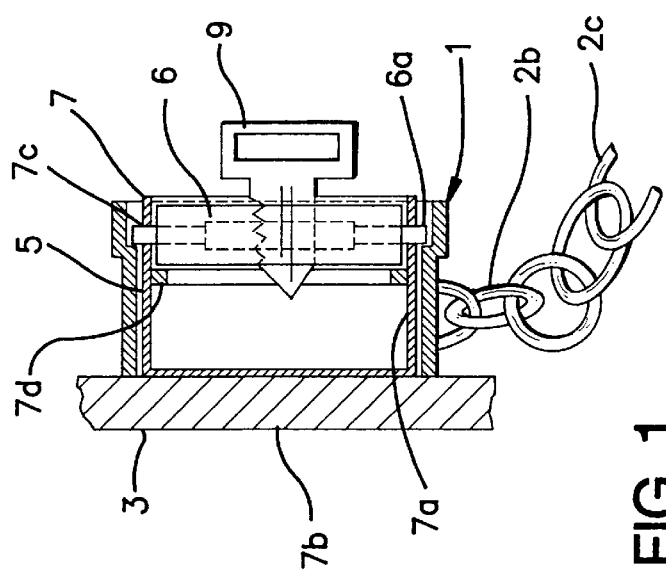
FIG. 1
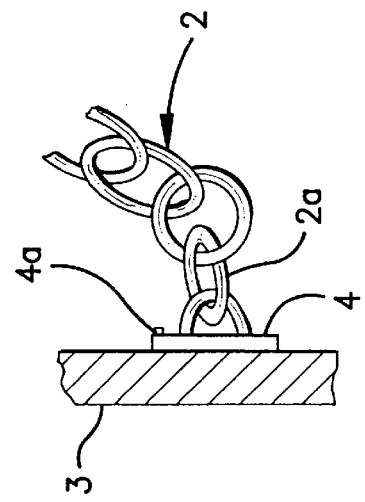

LOCKING SYSTEM

TECHNICAL FIELD

This invention relates generally to the problem of locking theft attractive objects, such as bicycles, skiing equipment, golf equipment, boats/boat motors, etc., when said objects are placed outdoors or in common rooms, and relates particularly to a method and to a lock system for locking such objects.

BACKGROUND ART

The general background of the invention is the fact that the theft of theft attractive property of the aforesaid kind is steadily increasing. The theft of bicycles represents the worst problem in most aspects, and the following description will therefore concentrate on just this problem. It will be understood, however, that the problem is fundamental to the theft of skiing equipment and golf equipment, and so on.

The bicycle has become an increasingly popular alternative mode of transportation in keeping with people's awareness of the need to protect the environment and also in keeping with the physical exercise that cycling affords. This has led to the sale of more bicycles and more well equipped bicycles at much higher prices than was earlier the case. Consequently, bicycles are often stolen with the purpose of selling the bicycles for cash either within the country where the theft took place or abroad. Persons who perpetrate such thefts are more or less organized bodies. In earlier times a bicycle was often stolen as a means of transportation, i.e. "borrowed" late at night on weekends in order to travel home from a public house, night club or some like establishment and were later recovered to a greater extent than at the present time, sometimes in a relatively undamaged state.

This change in the nature of bicycle thefts has resulted in greater demands on the security of bicycle locking devices, wherein present day bicycle locks shall not only prevent the immediate use of a bicycle but shall also prevent the bicycle from being carried away, or at least make it difficult to carry away. As beforementioned, present day bicycles are so expensive as to render the purchase of a bicycle of certain designs a large and noticeable investment to the purchaser and also to render the bicycle worthy of the best protection possible.

With regard to Swedish circumstances, an insured bicycle carries a self-risk against theft of at least SEK 1000 and in order to give time for the bicycle to be found and recovered there is a minimum waiting period of one month before the insured person is recompensed for his/her loss. The theft of a bicycle is therefore very burdensome to the owner, particularly when the owner is dependent daily on the bicycle, for instance to travel to and from his place of employment. In order to file a valid claim against bicycle insurance, it is, of course, necessary to prove that the bicycle was locked at the time of the theft. In addition to requiring the bicycle to be locked with a fixed built-in lock, which is a general requirement, some insurance companies also require the bicycle to be locked firmly to some other object, for instance in a bicycle rack, to a post or to some form of building structure, or that the bicycle is secured with at least one additional lock that includes a wire strop, or a stirrup-like lock.

A number of different types of bicycle locks are available commercially, of which some can be readily forced in a relatively short time while others are more stable and so constructed as to resist an attempt to force the lock for at least so many minutes as to deter a presumptive thief from stealing a bicycle that is secured with such a lock. Most lock alternatives available to cyclists at the present time are reasonably priced.

In recent years, different site-bound locking systems have been developed where the cyclist is able to firmly lock his/her bicycle, often without charge. These systems presumably have a deterring effect on the majority of thieves.

When seen against this background, it is surprising that the theft of bicycles increases steadily, despite the number of bicycle lock alternatives now available to the person wishing to keep his/her bicycle. The reason may lie in the fact that many bicycles, perhaps the majority of bicycles, are still poorly locked, and when studying the lock systems available hitherto it will be seen that this is mainly due to the known systems being encumbered with drawbacks of such a kind and of such seriousness that the lock systems are considered too complicated by the cyclist.

Wire-strop locks and stirrup locks are bulky when carried on a bicycle during a journey, normally hanging from some part of the bicycle. These locks are in the way, take up room on luggage carriers and may also constitute a safety risk if hung from the handlebars. They can be awkward in the lock mechanism and are always difficult to fit correctly when locking the bicycle, as they often need to be threaded through the rear wheel of the bicycle in one way or another. The cyclist is required to stoop, drop everything and leave both hands free before he or she is able to lock his/her bicycle. There is a serious risk of the clothes of the cyclist being dirtied and possibly torn in conjunction with this procedure, since the person concerned needs to move in the immediate vicinity of dirty and outwardly projecting parts of the bicycle.

In the best of cases there will be found a permanently fixed object, such as a post or the like, around which the wire strop lock or stirrup lock can be passed and therewith require the use of a bolt clipper at least in order to release the bicycle. In other cases, it is still possible to simply carry away a bicycle with locks and all, so that these locks can be removed later on in peace and quiet.

Chains and padlocks have all the aforesaid drawbacks besides being much more bulky to carry along.

Those site-bound bicycle racks that have locking facilities and which are now commercially available are also encumbered with obvious drawbacks which has meant that these racks have not found use in practice to any great extent. With some of these racks it is necessary to bend down to pedal level in order to padlock the bicycle. Other racks have more comfortable maneuvering heights, although they still require the cyclist to carry his/her own padlock, stirrup lock or wire strop lock. It is necessary to use both hands when securing all of these locks.

Finally, site-bound bicycle locks are also available in which the cyclist is not required to provide his/her own lock. These locking systems, however, require space, with the result that many cyclists are denied the possibility of parking their bicycles securely, and are often relatively complicated and require different installation measurements in streets and in parking facilities in order to function satisfactorily. This renders such systems less attractive to those who wish to hire out such systems, because they are expensive and difficult to make cost effective. Permanent cycle racks are also mostly inflexible and difficult to move or to combine with different locking systems.

Cycle garages that are located in or in the close proximity of an apartment building or tenement building are often difficult to reach. The cyclist is often forced to carry his/her bicycle down a flight of steps, through a number of self-closing locked doors, past parked cars, etc., before finally reaching a confined room which is filled with bicycles, often tangled together. The bicycle must also be reliably locked in such rooms in order for an insurance claim to be valid, even though the door is always locked.

In summary it can be maintained that with present day locking systems the cyclist is constantly faced with the difficulty of locking his/her bicycle in a reliable fashion wherever he/she may be found. This is the reason why so many bicycles are left standing outdoors unlocked or locked solely by the permanent built-in bicycle lock. The cyclist does not have the time or the energy to lock the bicycle reliably, or does not wish to risk becoming dirty or to be adversely affected by the locking procedure. The cyclist simply trusts in luck and hopes that he/she will be able to return to the bicycle before any one has had time to steal it. It is these unlocked or poorly locked bicycles that are stolen. There is every indication that the number of bicycles that are stolen will decrease dramatically when the cyclist is able to lock his/her bicycle quickly, simply and comfortably at a reasonable cost.

DISCLOSURE OF THE INVENTION

Accordingly, the object of the present invention is to provide a locking method and a lock system of the aforedescribed kind with which the aforesaid drawbacks associated with known methods and systems are eliminated, or at least minimized, and which enable locking to be effected at reasonable costs, quickly, simply and comfortably while being exceptionally flexible at the same time.

This object is achieved in accordance with the invention by a locking method and a lock system that have the characteristic features set forth in herein.

BRIEF DESCRIPTION OF THE DRAWINGS

The present invention will now be described in more detail with reference to exemplifying embodiments thereof and also with reference to the accompanying schematic drawings, in which FIG. 1 is a side view, in longitudinal section, of a basic embodiment of an inventive lock system and shows the system in a locked state;

FIG. 2 is a perspective view of the lock system shown in FIG. 1;

MODE FOR CARRYING OUT THE INVENTION

Figure 3:
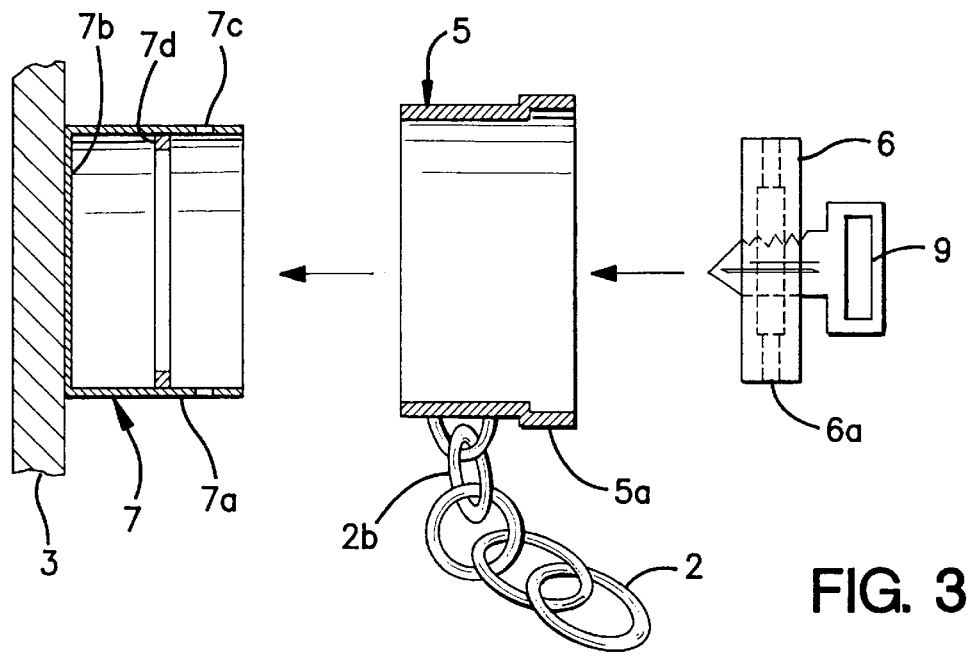
FIG. 3 is a view corresponding to the view of FIG. 1 but shows the lock system components in a mutually separated state with the intention of illustrating locking of the system.

As will be evident from FIGS. 1, 2 and 3, the basic inventive lock system 1 includes an anchoring member 2 having a generally elongated shape, a separate lock 6 which is intended to be carried by the user, and a "lock chest" 7, i.e. a housing for receiving the lock 6 in a securely locked fashion. In the illustrated case, the anchoring member 2 has the form of a conventional chain, although it may alternatively have the form of wire strop or a stirrup-like member. The anchoring member 2 shall be sufficiently flexible, i.e. bendable, pivotal or swingable, in at least one plane so as to enable the anchoring member to be moved between a first position out of engagement with a bicycle which is to be locked and a second position in which the bicycle is securely locked in the manner described herebelow.

In accordance with the invention, the anchoring member 2 has provided on a first end 2a thereof an attachment plate 4 or the like with which said member can be stationarily connected to a fixed, preferably immovable object 3 (indicated in FIG. 1), which may comprise a structural member, a ground-anchored post or a concrete block which serves as a bicycle rack at the same time, etc. Attachment of the anchoring member 2 to said object, i.e. attachment of the attachment plate 4, shall therewith be effected with such fastener devices 4a (only indicated in FIG. 1) as manipulation-safe bolts, welds etc., such that said plate cannot be loosened without considerable damage and/or without the use of special tools. Such fastener devices are known within different technical fields and will not therefore be described in detail here.

The other end 2b of the anchoring member has affixed thereto a coupling member 5 (see in particular FIG. 3) which in the illustrated embodiment, where the separate, owner-carried lock 6 is a cylinder lock, has the form of a coupling sleeve of generally cylindrical shape which is intended to be pushed onto the lock chest 7 (described below) when locking the bicycle. It will be understood that the coupling member 5 may have one of many different constructions which will enable coupling it up with a lock chest 7 and locking it thereto with the aid of the separate lock 6, and the invention thus also includes embodiments in which the coupling member is inserted into the lock chest and where, in other types of locks, the coupling member has a shape other than a generally cylindrical shape and adapted to the shape of the lock chest.

In the illustrated embodiment, the coupling member 5 has along the major part of its length an inner diameter which is slightly greater than the outer diameter of the lock chest 7 and its outer end in a mounted state includes a widened part 5a which is intended to receive and protect latch elements 6a in the lock 6 (as described below) when securing the lock. Naturally, the coupling member 5 shall be made of a material that is capable of withstanding a heavy force.

As illustrated, the lock chest 7 of the illustrated embodiment also has a generally cylindrical wall 7a which is open at one end to form a space for receiving the lock/lock cylinder 6, although, like the coupling element, it may have a different configuration when another type of lock is used. The other end of the lock chest 7 is closed by a bottom wall b which functions as an attachment plate for attaching the lock chest to a permanently fixed object 3 in accordance with the aforegoing, preferably by means of fastener devices (not illustrated) of the same type mentioned above with respect to the anchoring member 2. The cylindrical wall 7a includes in the region of its outer open end a number of through penetrating openings 7c for receiving the latch elements 6a of the lock 6 when locking said lock inserted into the lock chest. The position to which the lock 6 is inserted in the axial direction of the lock chest is determined by a stop flange 7d provided on the inner surface of the lock chest 7. This applies in particular to the illustrated embodiment of the lock chest which has a greater depth that is adapted to the FIG. 5 embodiment with the lock chest integrated with the permanent built-in bicycle lock. The additional space is required to provide room for the longer key that is used in this case. All lock chests included in the system will preferably be manufactured from the start with this extra depth in order to provide the possibility of free combination with integrated lock chests and therewith maximum flexibility.

The bottom wall 7b and the cylindrical wall 7a shall be imperforate, with the exception of the openings 7c, so as to exclude the possibility of forcing the lock 6 from the lock chest 7. The lock chest shall also be made from a material capable of withstanding pronounced violence.

The outer circumferential surface of the lock/lock cylinder 6 and the inner space of the lock chest 7 will conveniently have complementary configurations (not shown) so that the lock cylinder will be guided into the lock chest in a correct position for inserting the latch elements into said openings. These formations or configurations may comprise matching grooves-projections, bevels-thickenings, etc. for facilitating insertion of the lock into the lock chest.

Although the illustrated lock 6 has the form of a lock cylinder, which is believed to be preferable in most cases, not least for reasons of space and convenience, it will be understood that the separate lock 6 may have a different design. The illustrated lock 6 has two latch elements 6a which can be projected out radially and which in the locked position engage in respective openings 7c in the lock chest 7. Preferably, in their non-latching position the latch elements 6a are spring biased radially outwards, such that when the lock is inserted into a lock chest the latch elements will automatically snap into said openings 7c and hold the lock firmly in the lock chest 7. When the key 9 is rotated clockwise through an angle of 45° for instance, the latch elements 6a will be locked in an outwardly projected position and the key 9 can then be removed from the lock. When wishing to remove the lock from the lock chest 7, the key is inserted into the lock 6 and turned anticlockwise through 45°, therewith releasing the latch elements 6a with said elements being held in their outwardly projected position by the spring bias. The latch elements are retracted into the lock so that the lock can be removed from the chest, by turning the key anticlockwise through a further 20°. The lock will conveniently be constructed so that the key can only be removed from the lock when the lock is in a locked state, wherewith the key will always be in place in the lock when the lock is not used.

Figure 4:
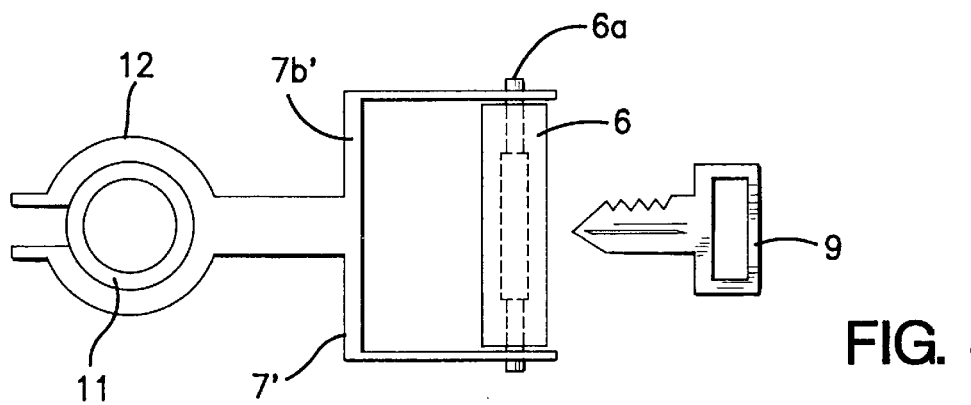
FIG. 4 illustrates one embodiment of a lock chest for attachment to a bicycle frame.

FIG. 4 illustrates an alternative embodiment of the lock chest 7'. In this embodiment, at the bottom wall 7b', the lock chest is provided with a generally stirrup-shaped clamp means 12 which is intended to be fastened to the frame 11 of a bicycle (indicated in FIG. 4), for instance on the saddle post immediately beneath the saddle. This lock chest embodiment which in other respects may be identical with the lock chest according to FIGS. 1–3, is primarily intended to function as a lock storage place when the lock 6 is not in use, whereby the lock will always be brought along, secured to the bicycle and need not be carried in a pocket of the user's clothing or placed loosely on the bicycle. Provided that the lock chest 7' of the illustrated embodiment is also connected to the frame in a manner which requires a strong force or a special tool to remove the chest, the coupling member 5 of the anchoring member 2 can be coupled directly to the lock chest 7' of the cycle frame and secured firmly thereto by the lock 6, thereby eliminating the need to pass the anchoring member around the frame.

Figure 5:
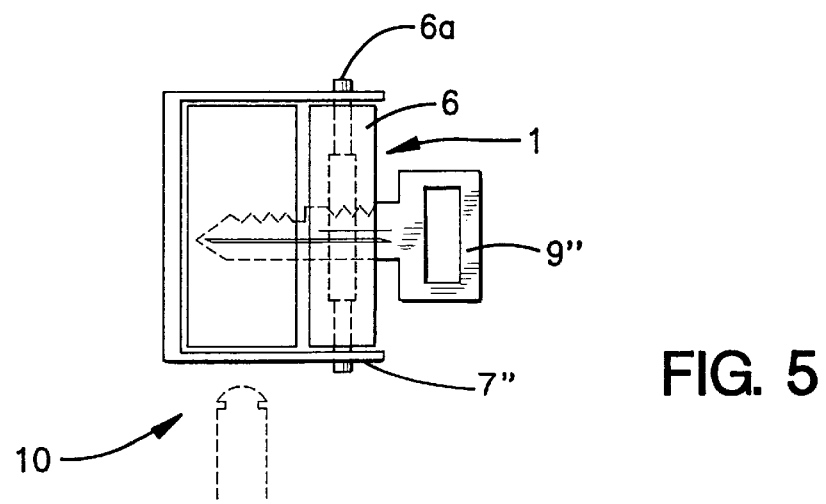
FIG. 5 illustrates another embodiment of a lock chest integrated in a permanent or fixed bicycle lock.

Finally, FIG. 5 illustrates a further lock chest variant 7" which is integrated in the permanent bicycle lock 10, preferably a block-type lock (a heavy duty lock normally welded to the rear fork of the bicycle). This is an embodiment which can be developed in the future together with the manufacturers of traditional bicycle locks and/or bicycle manufacturers. More specifically, the lock chest 7" is constructed as an extension of the lock chest of the standard built-in lock 10 and corresponds to the embodiment illustrated in FIGS. 1–3 with the exception that a separate bottom wall is not needed in this case since the wall is formed by the standard permanent lock. The inner stop flange may also be omitted if desired. The main advantage afforded by this embodiment is that the standard lock 10 and the inventive lock system 1 can, in this case, be operated simultaneously with one and the same key 9" having an extended key-bit which includes two functional parts, namely an outermost part which fits into the block-type lock 10 and an inner part which fits into the separate lock 6 of the lock system 1. This embodiment provides two bicycle locks that are mounted in one and the same position and that can be operated with the aid of one and the same key. Similar to the FIG. 4 embodiment, the lock chest 7" illustrated in FIG. 5 can be used either to lock the coupling element 5 of the anchoring member 2 directly or used solely as a lock storage space when the lock 6 is not in use.

It will be evident from the above description that in accordance with the proposed inventive method the anchoring member 2 is connected to a permanent object 3 as before described by the user herself/himself or preferably by a public leasing agency, such as a local authority, a regional shopping precinct, a tenant-owners' body, etc. When locking the bicycle, in the basic embodiment, the anchoring member is passed around a part of the bicycle and the coupling member 5 is pushed up onto a lock chest 7, which is similarly connected to the permanently fixed object, and locked firmly with the separate lock 6, which is either kept in the user's pocket or in a lock chest mounted on the bicycle. Alternatively, the coupling member 5 is pushed up directly onto the bicycle-connected lock chest 7', 7" and firmly locked thereto, without being passed around any part of the bicycle.

The aforesaid locking method and lock system eliminate the deficiencies of bicycle locks used hitherto and described in the introduction. The bicycle can be locked anywhere where an anchoring member has been placed. The coupling and locking procedures can be effected with one hand with minimum stooping, if at all, and without risk of becoming dirty. The locking can thus be made quickly, simply and safely in an unforbidden fashion. The smoothness with which a bicycle can be locked is further enhanced when the lock is kept on the bicycle and locked directly thereto.

All parts of the lock system can be manufactured and assembled at a reasonable cost and investments will therefore be small both to the public bicycle parking authority and to the user. The system requires a thief to force two locks, which is believed to effectively deter a presumptive thief.

Although the invention has been described in the aforegoing exclusively with reference to locking bicycles it will again be emphasized that it can also be used to securely lock golf equipment and skiing equipment, boat motors/boats etc. by making minor modifications. Standardization of the lock system components will provide a system of incomparable flexibility, since a user would be able to use one and the same lock/lock cylinder to lock different types of equipment in different circumstances, in accordance with the aforegoing.

It will also be understood that the inventive concept includes all variations and modifications that become apparent to one of normal skill in the art and which fall within the scope of the following claims.

I claim:

1. A locking system for locking theft attractive property to a fixed object, comprising, a separate lock comprising latch elements; a lock chest comprising an outer wall having openings therein, said lock chest being fixedly connectable to one of a fixed object and a theft attractive property; and an anchoring member having, a first end which is fixedly connectable to one of said fixed object and said theft attractive property, and a second end which comprises a coupling element, said coupling element being matable with said lock chest, and each latch element being engagable with a respective opening and with said coupling element to lock together said coupling element and said lock chest, in a locking mode.

2. Locking system in accordance with claim 1, wherein the coupling element, along a major part of its length, has an inner diameter which is somewhat larger than an outer diameter of said lock chest, said lock chest being matable within said coupling element, and wherein said coupling element comprises means for receiving and protecting the latch elements in the locking mode.

3. Locking system in accordance with claim 2, wherein an inner wall surface of said lock chest and an outer wall surface of said lock have complementary formations for guiding said lock to a position enabling the reception of said latch elements in said openings in the locking mode.

4. Locking system in accordance with claim 3, wherein said anchoring member has a generally elongate form, and is pivotal or flexible in at least one plane.

5. A lock system according to claim 1, wherein the coupling element of the anchoring member can be pushed on or inserted into the lock chest, in that the lock chest includes means which in the locked mode of said lock coact with the latch elements, wherein said latch element coacting means function to lock the lock in the lock chest and therewith lock the coupling element in its coupled state.

6. A lock system according to claim 5, wherein the coupling element has along the major part of its length an inner diameter which is slightly greater than the outer diameter of the lock chest and is provided at its outer end, seen in its mounted state, with a widened part which is intended to surround the latch elements of said lock in the locking mode and therewith protect said latch elements against damage.

7. A lock system according to claim 1, wherein the coupling element has along the major part of its length an inner diameter which is slightly greater than the outer diameter of the lock chest and is provided at its outer end, seen in its mounted state, with a widened part which is intended to surround the latch elements of said lock in the locking mode and therewith protect said latch elements against damage.

8. A lock system according to claim 7, wherein the separate lock is comprised of a lock cylinder, in that the lock chest has a generally cylindrical shape with an internal space adapted to receive the cylinder of said lock and has openings in a cylinder wall for receiving the latch elements on the lock cylinder, and in that the coupling element of the anchoring member is comprised of a coupling sleeve that can be pushed onto the lock chest.

* * * * *